United States Patent
Hein et al.

(10) Patent No.: US 11,193,025 B2
(45) Date of Patent: Dec. 7, 2021

(54) THERMOPLASTIC COMPOSITION INCLUDING PASSIVATED CHROMOPHORE

(71) Applicant: SHPP Global Technologies B.V., Bergen Op Zoom (NL)

(72) Inventors: Christopher Luke Hein, Evansville, IN (US); Bing Zhou, Evansville, IN (US); Robert Russell Gallucci, Mt. Vernon, IN (US)

(73) Assignee: SHPP Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 16/651,589

(22) PCT Filed: Dec. 21, 2018

(86) PCT No.: PCT/US2018/067273
§ 371 (c)(1),
(2) Date: Mar. 27, 2020

(87) PCT Pub. No.: WO2019/126738
PCT Pub. Date: Jun. 27, 2019

(65) Prior Publication Data
US 2020/0308414 A1 Oct. 1, 2020

Related U.S. Application Data

(60) Provisional application No. 62/609,057, filed on Dec. 21, 2017.

(51) Int. Cl.
*C09C 3/12* (2006.01)
*C08K 3/105* (2018.01)
*C08L 69/00* (2006.01)
*C08K 3/22* (2006.01)
*C08K 9/08* (2006.01)
*C09C 1/00* (2006.01)

(52) U.S. Cl.
CPC ............... *C09C 3/12* (2013.01); *C08K 3/105* (2018.01); *C08K 3/22* (2013.01); *C08K 9/08* (2013.01); *C08L 69/00* (2013.01); *C09C 1/00* (2013.01); *C01P 2006/64* (2013.01); *C01P 2006/65* (2013.01); *C01P 2006/66* (2013.01); *C08K 2003/2262* (2013.01)

(58) Field of Classification Search
CPC .................................. C08K 3/105; C08K 3/11
See application file for complete search history.

(56) References Cited

U.S. PATENT DOCUMENTS

| 6,692,659 B2 | 2/2004 | Brown et al. |
| 6,723,864 B2 | 4/2004 | Silva et al. |
| 7,858,700 B2 * | 12/2010 | Bhat ............... C08L 69/00 525/101 |
| 8,282,728 B2 | 10/2012 | Subramanian et al. |
| 8,937,127 B2 | 1/2015 | Sybert et al. |
| 9,006,319 B2 | 4/2015 | Gallucci et al. |
| 9,139,770 B2 | 9/2015 | Freeman et al. |
| 9,711,695 B2 | 7/2017 | Evans et al. |
| 2004/0039145 A1 | 2/2004 | Silva et al. |
| 2010/0317503 A1 | 12/2010 | Subramanian et al. |
| 2013/0345458 A1 | 12/2013 | Freeman et al. |

FOREIGN PATENT DOCUMENTS

| CN | 102282212 A | 12/2011 |
| CN | 105968771 A | 9/2016 |
| FR | 2801894 A1 | 6/2001 |
| JP | H1143597 A | 2/1999 |
| JP | 2005290137 A | 10/2005 |
| JP | 2007191608 A | 8/2007 |
| WO | 2009010537 A1 | 1/2009 |
| WO | 2013175448 A1 | 11/2013 |
| WO | 2014072923 A1 | 5/2014 |

OTHER PUBLICATIONS

Machine translation of JP 2005-290137 A, published Oct. 20, 2005.*
International Search Report for International Application No. PCT/US2018/067273, International Filing date Dec. 21, 2018, dated Mar. 15, 2019, 6 pages.
Rosenberg, "A Chemist Accidentally Creates a New Blue. Then What?" Jul. 16, 2016, Oregon State University, 9 pages.
Written Opinion for International Application No. PCT/US2018/067273, International Filing date Dec. 21, 2018, dated Mar. 15, 2019, 7 pages.

* cited by examiner

*Primary Examiner* — Vickey Nerangis
(74) *Attorney, Agent, or Firm* — Quicker Law, LLC

(57) ABSTRACT

A thermoplastic composition comprising: a polymer material; and a passivated inorganic chromophore comprising an inorganic chromophore and a passivation layer, wherein the inorganic chromophore has the formula: $AM_{1-x}M'_xM''_yO_{3+y}$, wherein A, M, M', M", x, and y are as provided herein, and wherein the passivation layer is derived from a passivation material comprising a polysiloxane having at least one functional group that is hydride, hydroxy, alkoxy, aryloxy, epoxy, carboxy, amino, or a combination thereof.

21 Claims, No Drawings

THERMOPLASTIC COMPOSITION INCLUDING PASSIVATED CHROMOPHORE

CROSS REFERENCE TO RELATED APPLICATIONS

This application is a National Stage application of PCT/US2018/067273, filed Dec. 21, 2018, which claims the benefit of U.S. Provisional Application No. 62/609,057, filed Dec. 21, 2017, the contents of all of which are incorporated herein by reference in their entirety.

BACKGROUND

The present disclosure relates to thermoplastic compositions including passivated inorganic chromophores and to methods of making colored thermoplastic articles.

Thermoplastic polymer compositions, for example polycarbonate compositions, can include inorganic pigments for color. However, inorganic pigments have been found to degrade polycarbonate during melt extrusion. This degradation can lead to yellowing of the resin, which results in color and appearance problems. The degradation can also limit the weatherability of the colored polycarbonate. Furthermore, injection molding consistency is less reliable due to melt flow instability and mechanical properties such as impact strength are reduced. Diminished flame retardance is likely in parts molded from degraded resins.

Thus, there remains a need for thermoplastic compositions that include a colorant for desirable appearance without degradation of mechanical properties.

BRIEF DESCRIPTION

Provided is a thermoplastic composition including a polymer material; and a passivated inorganic chromophore comprising an inorganic chromophore and a passivation layer, wherein the inorganic chromophore has the formula: $AM_{1-x}M'_xM''_yO_{3+y}$, wherein A is Sc, Y, Gd, Tb, Dy, Ho, Eu, Er, Tm, Yb, Lu, Al, Zn, In, Ga, Ti, Sn, Fe, Mg, or a combination thereof; M is Sc, Y, Gd, Tb, Dy, Ho, Eu, Er, Tm, Yb, Lu, Al, In, Ga, Fe, Mn, or a combination thereof, or M is a 1:1 mixture of MA and MB cations where MA is Zn, Mg, or Cu, and MB is Ti or Sn; M' is Mn, Fe, Al, Ga, In, or a combination thereof, M' is a +3 cation, and at least some $M'^{3+}$ cations are bound to oxygen in trigonal bipyramidal coordination as $M'O_5$; M" is Mg, Zn, Cu, or a combination thereof; $0<x\leq0.8$; y is an integer of 0 to 15; at least one of M and M' comprises Al, Ga, or In; and when y=0, M' is Mn, A is Y, Gd, Tb, Dy, Ho, Eu, Er, Tm, Yb, Lu, or a combination thereof, and M is not Al, and wherein the passivation layer is derived from a passivation material comprising a polysiloxane having at least one functional group that is hydride, hydroxy, alkoxy, aryloxy, epoxy, carboxy, amino, or a combination thereof.

Also provided is a method of forming the thermoplastic composition, which includes contacting an effective amount of the passivation material and the inorganic chromophore under conditions effective to provide the passivated inorganic chromophore; and combining the passivated inorganic chromophore and the polymer material under conditions effective to provide the thermoplastic composition.

Articles including the thermoplastic composition are provided, wherein the articles have a chromaticity C* of 20 to 50 units, and a hue angle h° of 225 to 315 degrees, as determined using the CIE 1976 L*C*h° color scale.

The above described and other features are exemplified by the following detailed description.

DETAILED DESCRIPTION

It has been discovered that a thermoplastic composition including a passivated inorganic chromophore, such as a pigment, can provide molded articles having desirable color, appearance, weatherability, melt flow stability, flame retardance, and mechanical properties such as high impact strength. These and other properties of the thermoplastic composition including the passivated inorganic chromophore are superior to a similarly formulated composition that includes the inorganic chromophore without passivation.

An inorganic chromophore is an inorganic compound that, when included in a composition, imparts color to the composition. As used herein, "passivation" means that degradation of the thermoplastic composition by the inorganic chromophore during melt processing is reduced or minimized. Without being bound by theory, the passivation is believed to be occurring though a chemical reaction of the passivating material with the inorganic chromophore, which can include, for instance, forming a covalent bond, an ionic bond, a hydrogen bond, a dative bond, or the like. For example, passivation may involve reaction of a metal oxide of the inorganic chromophore with a silicon atom of the passivating material.

The thermoplastic composition includes a polymer material and a passivated inorganic chromophore comprising an inorganic chromophore and a passivation layer. The passivation layer is derived from a passivation material comprising a polysiloxane having at least one functional group that is hydride, hydroxy, alkoxy, aryloxy, epoxy, amino, or a combination thereof.

The polymer material is a thermoplastic polymer and can be an oligomer, a homopolymer, a copolymer, a block copolymer, an alternating block copolymer, a random polymer, a random copolymer, a random block copolymer, a graft copolymer, a star block copolymer, a dendrimer, or the like, or a combination thereof. The polymer can also be a blend of polymers, copolymers, terpolymers, or combinations thereof.

Examples of thermoplastic polymers that can be used include polyacetals (e.g., polyoxyethylene and polyoxymethylene), polyacrylamides, polyamides (e.g., aliphatic polyamides, polyphthalamides, and polyaramides), polyamideimides, polyanhydrides, polyarylates, polyarylene ethers (e.g., polyphenylene ethers), polyarylene sulfides (e.g., polyphenylene sulfides), polyarylene sulfones (e.g., polyphenylene sulfones), polybenzothiazoles, polybenzoxazoles, polycarbonates (including polycarbonate copolymers such as polycarbonate-siloxanes, polycarbonate-esters, and polycarbonate-ester-siloxanes), polyesters (e.g., polyethylene terephthalates, polybutylene terephthalates, polyarylates, and polyester copolymers such as polyester-ethers), polyetheretherketones, polyetherimides (including copolymers such as polyetherimide-siloxane copolymers), polyetherketoneketones, polyetherketones, polyethersulfones, polyimides (including copolymers such as polyimide-siloxane copolymers), poly((meth)acrylates) and their copolymers (such as poly(($C_{1-6}$ alkyl)(meth)acrylates) and acrylonitrile-styrene-acrylate (ASA)), polymethacrylamides, polynorbornenes (including copolymers containing norbornenyl units), polyolefins (e.g., polyethylenes, polypropylenes, polytetrafluoroethylenes, and their copolymers, for example ethylene-alpha-olefin copolymers), polyoxadiazoles, polyoxymethylenes, polyphthalides, polysilazanes, polysiloxanes, polystyrenes (including copolymers such as acrylonitrile-butadiene-styrene (ABS) and methyl methacrylate-butadiene-styrene (MBS)), polysulfides, polysulfonamides, polysulfonates, polysulfones, polythioesters, polytriazines, polyureas, polyurethanes, polyvinyl alcohols, polyvinyl esters, polyvinyl ethers, polyvinyl halides, polyvinyl ketones, polyvinyl thioethers, polyvinylidene fluorides, or the like, or a combination thereof; preferably a polyester, a polycarbonate, a polysiloxane, a polystyrene, a poly(meth)acrylate, a polyacrylonitrile, a polybutadiene, a blend thereof, a copolymer thereof, or a combination thereof, more preferably a polycarbonate, a poly(carbonate-ester), a poly(carbonate-siloxane), a polycarbonate polyester blend, a polycarbonate-ABS blend, a polycarbonate-ASA blend, or a combination thereof.

For example, the polymer material of the thermoplastic composition can comprise a polycarbonate. "Polycarbonate" as used herein means a homopolymer or copolymer having repeating structural carbonate units of formula (1)

(1)

wherein at least 60 percent of the total number of $R^1$ groups are aromatic, or each $R^1$ contains at least one $C_{6-30}$ aromatic group. Specifically, each $R^1$ can be derived from a dihydroxy compound such as an aromatic dihydroxy compound of formula (2) or a bisphenol of formula (3).

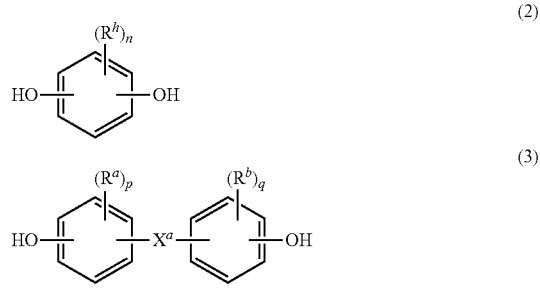

(2)

(3)

In formula (2), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In formula (3), $R^a$ and $R^b$ are each independently a halogen, $C_{1-12}$ alkoxy, or $C_{1-12}$ alkyl, and p and q are each independently integers of 0 to 4, such that when p or q is less than 4, the valence of each carbon of the ring is filled by hydrogen. In an aspect, p and q is each 0, or p and q is each 1, and $R^a$ and $R^b$ are each a $C_{1-3}$ alkyl group, specifically methyl, disposed meta to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group.

Specific dihydroxy compounds include resorcinol, 2,2-bis (4-hydroxyphenyl) propane ("bisphenol A" or "BPA"), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl)cyclohexane, and 1,1-bis(4-hydroxyphenyl)-3,3,5-trimethylcyclohexane (isophorone bisphenol). The polycarbonate can be a linear homopolymer containing bisphenol A carbonate units (BPA-PC), commercially available under the trade name LEXAN™ from SABIC; or a branched, cyanophenol end-capped bisphenol A homopolycarbonate produced via interfacial polymerization, containing 3 mol % 1,1,1-tris(4-hydroxyphenyl)ethane (THPE) branching agent, commercially available under the trade name LEXAN™ CFR from SABIC. A combination of a linear polycarbonate and a branched polycarbonate can be used. It is also possible to use a polycarbonate copolymer or interpolymer rather than a homopolymer.

The polycarbonates can have an intrinsic viscosity, as determined in chloroform at 25° C., of 0.3 to 1.5 deciliters per gram (dL/gm), specifically 0.45 to 1.0 dL/gm. The polycarbonates can have a weight average molecular weight (Mw) of 10,000 to 200,000 grams per mole (g/mol), specifically 20,000 to 100,000 g/mol, as measured by gel permeation chromatography (GPC), using a crosslinked styrene-divinylbenzene column and calibrated to polycarbonate standards. The polycarbonate can have a melt volume flow rate (MVR), measured at 300° C./1.2 kg, of 1 to 70 cubic centimeters per 10 minutes (cc/10 min), specifically 5 to 50 cc/10 min. Combinations of polycarbonates of different flow properties can be used to achieve the overall desired flow property.

"Polycarbonate" as used herein also includes copolymers comprising carbonate units and ester units ("poly(ester-carbonate)s", also known as polyester-polycarbonates). Poly (ester-carbonate)s further contain, in addition to recurring carbonate chain units of formula (1), repeating ester units of formula (4)

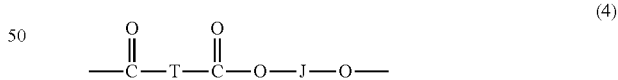

(4)

wherein J is a divalent group derived from a dihydroxy compound (which includes a reactive derivative thereof), and can be, for example, a $C_{2-10}$ alkylene, a $C_{6-20}$ cycloalkylene, a $C_{6-20}$ arylene, or a polyoxyalkylene group in which the alkylene groups contain 2 to 6 carbon atoms, specifically, 2, 3, or 4 carbon atoms; and T is a divalent group derived from a dicarboxylic acid (which includes a reactive derivative thereof), and can be, for example, a $C_{2-20}$ alkylene, a $C_{6-20}$ cycloalkylene, or a $C_{6-20}$ arylene. Copolyesters containing a combination of different T or J groups can be used. The polyester units can be branched or linear.

Exemplary dihydroxy compounds include aromatic dihydroxy compounds of formula (2) (e.g., resorcinol), bisphenols of formula (3) (e.g., bisphenol A), a $C_{1-8}$ aliphatic diol such as ethane diol, n-propane diol, i-propane diol, 1,4- butane diol, 1,6-cyclohexane diol, 1,6-hydroxymethylcyclohexane, or a combination thereof. Aliphatic dicarboxylic acids include $C_{6-20}$ aliphatic dicarboxylic acids (which includes the terminal carboxyl groups), specifically linear $C_{8-12}$ aliphatic dicarboxylic acid such as decanedioic acid (sebacic acid); and alpha, omega-$C_{12}$ dicarboxylic acids such as dodecanedioic acid. Aromatic dicarboxylic acids include terephthalic acid, isophthalic acid, naphthalene dicarboxylic acid, 1,6-cyclohexane dicarboxylic acid, or a combination thereof. For example, a combination of isophthalic acid and terephthalic acid can be used, wherein the weight ratio of isophthalic acid to terephthalic acid is 90:10 to 10:90.

Specific ester units include ethylene terephthalate units, n-proplyene terephthalate units, n-butylene terephthalate units, ester units derived from isophthalic acid, terephthalic acid, and resorcinol (ITR ester units), and ester units derived from sebacic acid and bisphenol A. The molar ratio of ester units to carbonate units in the poly(ester-carbonate)s can vary broadly, for example 1:99 to 99:1, specifically, 10:90 to 90:10, more specifically, 25:75 to 75:25, or from 2:98 to 15:85.

Poly(ester-carbonate)s, such as those comprising resorcinol isophthalate and terephthalate units and bisphenol A carbonate units, include those commercially available under the trade name LEXAN™ SLX from SABIC; bisphenol A carbonate units and isophthalate-terephthalate-bisphenol A ester units, also commonly referred to as poly(carbonate-ester)s (PCE) or poly(phthalate-carbonate)s (PPC), depending on the relative ratio of carbonate units and ester units; or bisphenol A carbonate units and $C_{6-12}$ dicarboxy ester units such as sebacic ester units (commercially available under the trade name HFD™ from SABIC).

$C_2$-$C_{13}$ alkenyl, $C_2$-$C_{13}$ alkenyloxy, $C_3$-$C_6$ cycloalkyl, $C_3$-$C_6$ cycloalkoxy, $C_6$-$C_{14}$ aryl, $C_6$-$C_{10}$ aryloxy, $C_7$-$C_{13}$ arylalkyl, $C_7$-$C_{13}$ aralkoxy, $C_7$-$C_{13}$ alkylaryl, or $C_7$-$C_{13}$ alkylaryloxy. E can have an average value of 2 to 1,000, or 2 to 500, or 2 to 200, or 2 to 125, or 5 to 80, or 10 to 80, or 10 to 70, or 10 to 40, or 40 to 80, or 40 to 70.

For example, the polysiloxane blocks can be of formula (6)

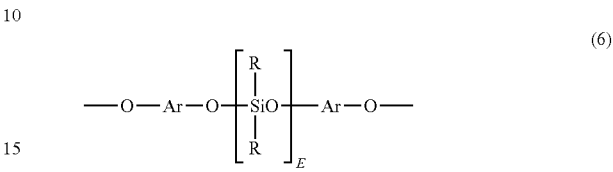

wherein E is as defined above; each R can be the same or different, and is as defined above; and Ar can be the same or different, and is a substituted or unsubstituted $C_{6-30}$ arylene, wherein the bonds are directly connected to an aromatic moiety. Ar groups in formula (6) can be derived from a dihydroxyarylene compounds such as 1,1-bis(4-hydroxyphenyl) methane, 1,1-bis(4-hydroxyphenyl) ethane, 2,2-bis (4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl)cyclohexane, bis(4-hydroxyphenyl sulfide), and 1,1-bis(4-hydroxy-t-butylphenyl) propane.

Specific examples of siloxane units of formula (6) include those of the formulas (6a) and (6b)

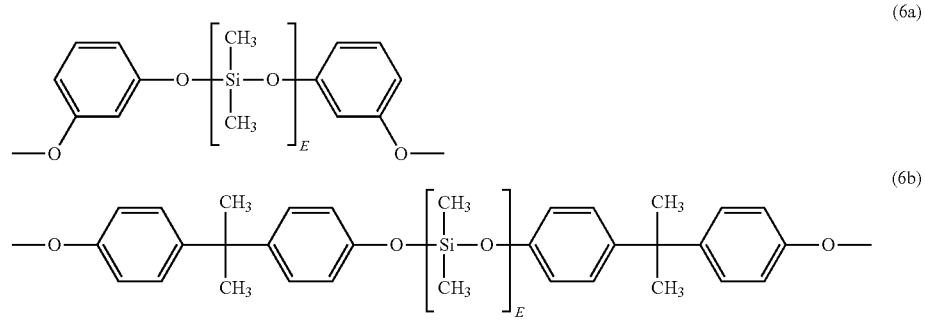

The polycarbonate copolymers comprising arylate ester units can have an $M_w$ of 2,000 to 100,000 g/mol, specifically 3,000 to 75,000 g/mol, more specifically 4,000 to 50,000 g/mol or 5,000 to 35,000 g/mol, and still more specifically 17,000 to 30,000 g/mol.

The polymer material can also comprise a poly(carbonate-siloxane), also referred to as a polycarbonate-polysiloxane copolymer. The polysiloxane blocks comprise repeating diorganosiloxane units as in formula (5)

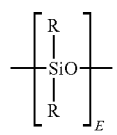

wherein each R is independently a $C_{1-13}$ monovalent organic group. For example, R can be a $C_1$-$C_{13}$ alkyl, $C_1$-$C_{13}$ alkoxy, wherein E is as described in Formula (5).

In another example, polysiloxane blocks are of formula (7)

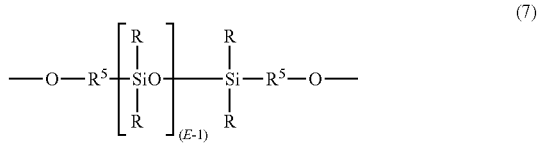

wherein R and E are as described above, and each $R^5$ is independently a divalent $C_{1-30}$ organic group, and wherein the polymerized polysiloxane unit is the reaction residue of its corresponding dihydroxy compound. For example, the polysiloxane blocks can have formula (8):

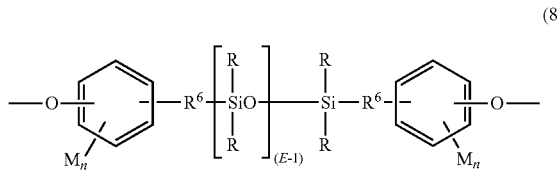

wherein R and E are as defined above. $R^6$ in formula (8) is a divalent $C_{2-8}$ aliphatic. Each M in formula (8) can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy, $C_{3-8}$ cycloalkyl, $C_{3-8}$ cycloalkoxy, $C_{6-10}$ aryl, $C_{6-10}$ aryloxy, $C_{7-12}$ aralkyl, $C_{7-12}$ aralkoxy, $C_{7-12}$ alkylaryl, or $C_{7-12}$ alkylaryloxy, wherein each n is independently 0, 1, 2, 3, or 4. For example, M is bromo or chloro, an alkyl such as methyl, ethyl, or propyl, an alkoxy such as methoxy, ethoxy, or propoxy, or an aryl such as phenyl, chlorophenyl, or tolyl; $R^6$ is a dimethylene, trimethylene, or tetramethylene; and R is a $C_{1-8}$ alkyl, haloalkyl such as trifluoropropyl, cyanoalkyl, or aryl such as phenyl, chlorophenyl, or tolyl. For example, R is methyl, or a combination of methyl and trifluoropropyl, or a combination of methyl and phenyl. In a specific example, R is methyl, M is methoxy, n is one, and $R^6$ is a divalent $C_{1-3}$ aliphatic group. Specific polysiloxane blocks are of the formulas

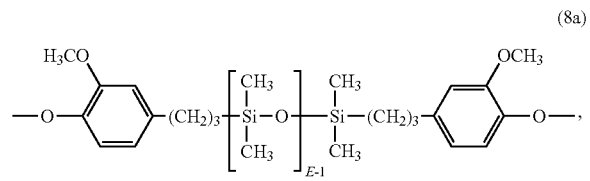

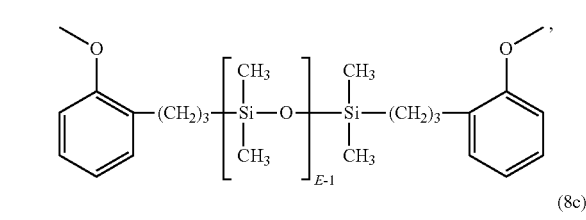

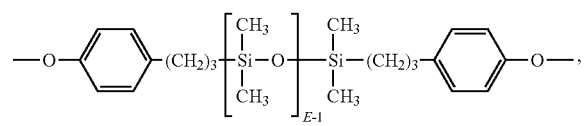

or a combination thereof, wherein E has an average value of 2 to 200, 2 to 125, 5 to 125, 5 to 100, 5 to 50, 20 to 80, or 5 to 20.

Blocks of formula (8) can be derived from the corresponding dihydroxy polysiloxane, which in turn can be prepared effecting a platinum-catalyzed addition between the siloxane hydride and an aliphatically unsaturated monohydric phenol such as eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. The poly(carbonate-siloxane) copolymers can then be manufactured, for example, by the synthetic procedure of EP0524731. Transparent poly(carbonate-siloxane) copolymers comprise carbonate units (1) derived from bisphenol A, and repeating siloxane units (8a), (8b), (8c), or a combination thereof (specifically of formula 8a), wherein E has an average value of 4 to 50, 4 to 15, specifically 5 to 15, more specifically 6 to 15, and still more specifically 7 to 10. The transparent copolymers can be manufactured using one or both of the tube reactor processes described in US 2004/0039145A1 or U.S. Pat. No. 6,723,864.

Examples of poly(carbonate-siloxane)s can include those comprising bisphenol A carbonate units and siloxane units (e.g., blocks containing 5 to 200 dimethylsiloxane units), such as those commercially available under the trade name EXL™ from SABIC; or both ester units and siloxane units (polycarbonate-ester-siloxanes), for example those comprising bisphenol A carbonate units, isophthalate-terephthalate-bisphenol A ester units, and siloxane units (e.g., blocks containing 5 to 200 dimethylsiloxane units), such as those commercially available under the trade name FST™ from SABIC.

The poly(carbonate-siloxane) copolymers can comprise 50 to 99 wt % of carbonate units and 1 to 50 wt % of siloxane units. Within this range, the polyorganosiloxane-polycarbonate copolymer can comprise 70 to 98 wt %, more specifically 75 to 97 wt % of carbonate units and 2 to 30 wt %, more specifically 3 to 25 wt % of siloxane units.

Polyorganosiloxane-polycarbonates can have an $M_w$ of 2,000 to 100,000 g/mol, specifically 5,000 to 50,000 g/mol as measured by GPC with polycarbonate standards. The polyorganosiloxane-polycarbonates can have an MVR, measured at 300° C./1.2 kg, of 1 to 50 cc/10 min, specifically 2 to 30 cc/10 min. Mixtures of polyorganosiloxane-polycarbonates of different flow properties can be used to achieve the overall desired flow property.

Polycarbonates can be manufactured by processes such as interfacial polymerization and melt polymerization, which are known, and are described, for example, in WO 2013/175448 A1 and WO 2014/072923 A1. An end-capping agent can be included during polymerization to provide end groups, for example monocyclic phenols such as phenol, p-cyanophenol, and $C_{1-22}$ alkyl-substituted phenols such as p-cumyl-phenol, resorcinol monobenzoate, and p- and tertiary-butyl phenol, monoethers of diphenols, such as p-methoxyphenol, monoesters of diphenols such as resorcinol monobenzoate, functionalized chlorides of aliphatic monocarboxylic acids such as acryloyl chloride and methacryoyl chloride, and mono-chloroformates such as phenyl chloroformate, alkyl-substituted phenyl chloroformates, p-cumyl phenyl chloroformate, and toluene chloroformate. Combinations of different end groups can be used. Branched polycarbonate blocks can be prepared by adding a branching agent during polymerization, for example trimellitic acid, trimellitic anhydride, trimellitic trichloride, tris-p-hydroxyphenylethane, isatin-bis-phenol, tris-phenol TC (1,3,5-tris ((p-hydroxyphenyl)isopropyl)benzene), tris-phenol PA (4(4 (1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 wt %. Combinations comprising linear polycarbonates and branched polycarbonates can be used.

In addition to the polycarbonates described above, combinations of the polycarbonate with other thermoplastic polymers, for example combinations of homopolycarbonates, copolycarbonates, and polycarbonate copolymers with polyesters, can be used. Exemplary polyesters include, for example, polyesters having repeating units of formula (4), which include poly(alkylene dicarboxylates), liquid crystalline polyesters, and polyester copolymers. Polyesters also include aromatic polyesters, poly(alkylene esters) including poly(alkylene arylates), and poly(cycloalkylene diesters). Exemplary aromatic polyesters include poly(isophthalate-terephthalate-resorcinol) esters, poly(isophthalate-terephthalate-bisphenol A) esters, poly[(isophthalate-terephthalate-resorcinol) ester-co-(isophthalate-terephthalate-bisphenol A)] ester, or a combination thereof. The aromatic polyesters can have 0.5 to 10 wt % of units derived from an aliphatic diacid or an aliphatic polyol to make copolyesters. Poly(alkylene arylates) include poly(alkylene terephthalate)s such as poly(ethylene terephthalate) (PET), poly(1,4-butylene terephthalate) (PBT), and poly(n-propylene terephthalate) (PPT); poly(alkylene naphthoates) such as poly (ethylene naphthanoate) (PEN), and poly(butylene naphthanoate) (PBN). Poly(cycloalkylene diester)s include poly(1,4-cyclohexanedimethylene terephthalate) (PCT).

The thermoplastic composition can further comprise a poly(imide), preferably a poly(etherimide), and can have good impact. Poly(etherimide)s include polyetherimide homopolymers and copolymers, for example poly(etherimide sulfone)s and poly(etherimide-siloxane)s, as described, for example, in U.S. Pat. No. 9,006,319, WO 2009/10537, and U.S. Pat. No. 8,937,127. The polyetherimide can comprise units comprising bisphenol A moieties and moieties derived from p-phenylene diamine, m-phenylene diamine, sulfonyl dianiline, chemical equivalents of the foregoing diamines, or a combination thereof. The polyetherimides can have a melt index of 0.1 to 10 grams per minute (g/min), as measured by ASTM D1238 at 340 to 370° C., using a 6.7 kg load. The polyetherimide can have an $M_w$ of 1,000 to 150,000 g/mol, or 10,000 to 80,000 g/mol as measured by GPC using polystyrene standards. Such polyetherimide polymers can have an intrinsic viscosity greater than 0.2 dL/g, or, more specifically, 0.35 to 0.7 dL/g as measured in m-cresol at 25° C.

In the thermoplastic composition, the inorganic chromophore has the formula (9):

$$AM_{1-x}M'_xM''_yO_{3+y} \qquad (9)$$

wherein A is Sc, Y, Gd, Tb, Dy, Ho, Eu, Er, Tm, Yb, Lu, Al, Zn, In, Ga, Ti, Sn, Fe, Mg, or a combination thereof; M is Sc, Y, Gd, Tb, Dy, Ho, Eu, Er, Tm, Yb, Lu, Al, In, Ga, Fe, Mn, or a combination thereof, or M is a 1:1 mixture of $M_A$ and $M_B$ cations where $M_A$ is Zn, Mg, or Cu, and $M_B$ is Ti or Sn; M' is Mn, Fe, Al, Ga, In, or a combination thereof, M' is a +3 cation, and at least some $M'^{3+}$ cations are bound to oxygen in trigonal bipyramidal coordination as $M'O_5$; M" is Mg, Zn, Cu, or a combination thereof; $0<x\leq0.8$; y is an integer of 0 to 15; at least one of M and M' comprises Al, Ga, or In; and when y=0, M' is Mn, A is Y, Gd, Tb, Dy, Ho, Eu, Er, Tm, Yb, Lu or a combination thereof, and M is not Al. In an aspect, A is Y, M is In, M' is Mn, and y is 0.

For example, the inorganic chromophore can be $YIn_{1-x}Mn_xO_3$, $DyIn_{1-x}Mn_xO_3$, $HoIn_{1-x}Mn_xO_3$, $ErIn_{1-x}Mn_xO_3$, $YSc_{1-x}Mn_xO_3$, $YFe_{1-x}In_xO_3$, $LuGa_{1-x}Mn_xMgO_4$, $ScAl_{1-x}Mn_xZnO_4$, $ScAl_{1-x}Mn_xMgO_4$, $InGa_{1-x}Mn_xZnO_4$, $InGa_{1-x}Mn_xMgO_4$, $ScGa_{1-x}Mn_xZnO_4$, $ScGa_{1-x}Mn_xMgO_4$, $LuGa_{1-x}Mn_xZnO_4$, $LuGa_{1-x}Mn_xMgO_4$, $LuGa_{1-x}Mn_xZn_2O_5$, $Y(Cu,Ti)_{1-x}Al_xO_3$, $Y(Cu,Ti)_{1-x}Ga_xO_3$, $Y(Cu,Ti)_{1-x}In_xO_3$, $Y(Cu,Ti)_{1-x}Fe_xO_3$, $Yb(Cu,Ti)_{1-x}Mn_xO_3$, $Lu(Cu,Ti)_{1-x}Mn_xO_3$, $Y(Fe,In)_{1-x}Mn_xO_3$, $Y(Mn,In)_{1-x}Fe_xO_3$, $(Y, Eu)Mn_{1-x}In_xO_3$, $In(In,Ga)_{1-x}Mn_xMgO_4$, or $Y(Ga,In)_{1-x}Mn_xO_3$. For example, the inorganic chromophore can be $YIn_{0.95}Mn_{0.05}O_3$, $YIn_{0.9}Mn_{0.1}O_3$, $YIn_{0.85}Mn_{0.15}O_3$, $YIn_{0.8}Mn_{0.2}O_3$, $YIn_{0.75}Mn_{0.25}O_3$, $YIn_{0.7}Mn_{0.3}O_3$, $YIn_{0.65}Mn_{0.35}O_3$, $YIn_{0.6}Mn_{0.4}O_3$, $YIn_{0.55}Mn_{0.45}O_3$, $YIn_{0.5}Mn_{0.5}O_3$, $DyIn_{0.9}Mn_{0.1}O_3$, $DyIn_{0.8}Mn_{0.2}O_3$, $DyIn_{0.7}Mn_{0.3}O_3$, $DyIn_{0.6}Mn_{0.4}O_3$, $DyIn_{0.5}Mn_{0.5}O_3$, $HoIn_{0.9}Mn_{0.1}O_3$, $HoIn_{0.8}Mn_{0.2}O_3$, $HoIn_{0.7}Mn_{0.3}O_3$, $HoIn_{0.5}Mn_{0.5}O_3$, $ErIn_{0.9}Mn_{0.1}O_3$, $ErIn_{0.8}Mn_{0.2}O_3$, $ErIn_{0.5}Mn_{0.5}O_3$, $YGa_{0.1}In_{0.8}Mn_{0.1}O_3$, $YGa_{0.1}In_{0.7}Mn_{0.2}O_3$, $YGa_{0.1}In_{0.6}Mn_{0.3}O_3$, $YFe_{0.1}In_{0.8}Mn_{0.1}O_3$, $YFe_{0.2}In_{0.7}Mn_{0.1}O_3$, $YFe_{0.3}In_{0.6}Mn_{0.1}O_3$, $YFe_{0.1}In_{0.7}Mn_{0.2}O_3$, $YFe_{0.2}In_{0.6}Mn_{0.2}O_3$, $YFe_{0.1}In_{0.6}Mn_{0.3}O_3$, $YFe_{0.2}In_{0.5}Mn_{0.3}O_3$, $YFe_{0.3}In_{0.4}Mn_{0.3}O_3$, $YFe_{0.1}In_{0.5}Mn_{0.4}O_3$, $YFe_{0.2}In_{0.4}Mn_{0.4}O_3$, $Y_{1.95}Er_{0.05}Mn_{0.25}In_{0.75}O_3$, $Y_{1.9}Er_{0.1}Mn_{0.25}In_{0.75}O_3$, $LuGa_{0.99}Mn_{0.01}MgO_4$, $LuGa_{0.97}Mn_{0.03}MgO_4$, $LuGa_{0.9}5Mn_{0.05}MgO_4$, $LuGa_{0.90}Mn_{0.10}MgO_4$, $LuGa_{0.85}Mn_{0.15}MgO_4$, $LuGa_{0.97}Mn_{0.03}ZnO_4$, $LuGa_{0.95}Mn_{0.05}ZnO_4$, $ScAl_{0.99}Mn_{0.01}MgO_4$, $ScAl_{0.95}Mn_{0.05}MgO_4$, $ScAl_{0.90}Mn_{0.95}Mg_4$, $ScAl_{0.85}Mn_{0.15}MgO_4$, $ScAl_{0.95}Mn_{0.05}ZnO_4$, $InGa_{0.95}Mn_{0.05}MgO_4$, $ScGa_{0.95}Mn_{0.05}ZnO_4$, $ScGa_{0.95}Mn_{0.05}MgO_4$, $LuGa_{0.99}Mn_{0.01}ZnO_4$, $LuGa_{0.95}Mn_{0.05}ZnO_4$, $In(In_{0.2}Ga_{0.5})_{0.95}Mn_{0.05}MgO_4$, $LuGa_{0.99}Mn_{0.01}Zn_2O_5$, $LuGa_{0.95}Mn_{0.05}Zn_2O_5$, $In(In_{0.2}Ga_{0.8})_{0.95}Mn_{0.05}O_5MgO_4$, $Y_{1.95}Eu_{0.95}Mn_{0.25}In_{0.75}O_3$, or $Y_{1.9}Eu_{0.1}Mn_{0.25}In_{0.75}O_3$.

The inorganic chromophore can comprise a manganese (III) material of the formula $YIn_{1-x}Mn_xO_3$, wherein $0<x\leq0.8$. For example x can be from 0.01 to 0.09, or from 0.11 to 0.19, or from 0.21 to 0.29, or from 0.31 to 0.39, or from 0.41 to 0.49, or from 0.51 to 0.59, or from 0.61 to 0.69, or from 0.71 to 0.79.

In the thermoplastic composition, the passivated inorganic chromophore is present in an amount of 0.01 to 50 wt %, preferably 0.01 to 10 wt %, more preferably 0.05 to 5 wt %, even more preferably 0.1 to 2.5 wt %, based on the total weight of the thermoplastic composition. The thermoplastic composition can include one or more passivated inorganic chromophores, wherein the total amount of passivated inorganic chromophores is from 0.01 to 50 wt %, preferably 0.01 to 10 wt %, more preferably 0.05 to 5 wt %, even more preferably 0.1 to 2.5 wt %, based on the total weight of the thermoplastic composition. The passivated inorganic chromophore can be present in the thermoplastic composition at higher concentration (e.g., 5 to 50 wt % or 10 to 50 wt %) to form a pelletized color concentrate that can be mixed with an uncolored thermoplastic composition to form a colored mixture, wherein the colored mixture has, for example, 0.01 to 10 wt %, or 0.05 to 5 wt %, or 0.1 to 2.5 wt % of the passivated inorganic chromophore, based on the total weight of the colored mixture.

The inorganic chromophores can be prepared by heating mixtures of reactants, such as metal oxides, in air. For example, powders of $Y_2O_3$, $Mn_2O_3$, and $In_2O_3$ can be mixed and heated to produce $YIn_{1-x}Mn_xO_3$. The inorganic chromophore can have a color that varies along a continuum to form a homologous color series as the value of x increases. For example, the material of formula $YIn_{1-x}Mn_xO_3$ exhibits an intense blue color that darkens and eventually appears black as x increases. Thus, a material having a desired color along the continuum can be prepared by selecting the value of x corresponding to the desired color, and combining the reactants in stoichiometric quantities according to the selected value of x.

The reactants can be dried, e.g., at 800-1,000° C., before mixing. The reactants can be mixed, for example, by dissolving the reactants in a suitable solvent or by mechanical mixing (e.g., mortar-and-pestle, ball milling). Alternatively, the powders can be mixed, e.g., by mortar and pestle or agate ball mill, under a suitable liquid in which they are substantially insoluble, e.g., a lower alkyl (i.e., 1-10 carbon atoms) alcohol such as methanol or ethanol. For example, the materials can be prepared by dissolving hydrated nitrate salts of the metals in deionized water. An organic acid (e.g., citric acid) is added to the solution, and the solution then is neutralized with an aqueous base (e.g., ammonium hydroxide). The solution is evaporated to form a viscous gel, which subsequently is combusted. The mixed powders can be pressed into pellets. For example, the powders may be pressed into pellets using a pressure of 500 psi. The mixed, and optionally pelleted, powders are calcined in air, for example at 700-1,500° C. for 2-20 hours.

Other synthesis techniques such as sol-gel, co-precipitation, hydrothermal including supercritical conditions, spray drying, freeze drying, high-temperature spray pyrolysis (e.g., $TiO_2$ and ZnO) can be used to prepare powders.

The passivation layer is derived from a passivation material of formula (10)

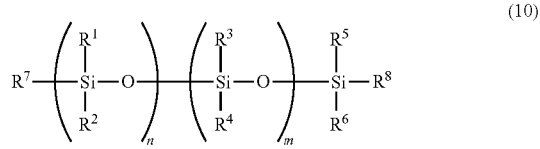

(10)

wherein the passivation material has at least one functional group that is hydride, hydroxy, alkoxy, aryloxy, epoxy, carboxy, amino, or a combination thereof, preferably a hydride. Each $R^1$ is the same or different, and is hydrogen, $C_{1-20}$ alkyl, $C_{1-20}$ heteroalkyl, $C_{2-20}$ alkenyl, $C_{2-20}$ alkynyl, $C_{4-20}$ cycloalkyl, or $C_{6-24}$ aryl, each optionally substituted with one or more $-Si(R^{1a})_3$ groups. Preferably, each $R^1$ is the same or different, and is hydrogen or $C_{1-6}$ alkyl, $C_{1-7}$ heteroalkyl, $C_{2-6}$ alkenyl, $C_{2-6}$ alkynyl, $C_{4-7}$ cycloalkyl, or $C_{6-12}$ aryl, each optionally substituted with one or more $-Si(R^{1a})_3$ groups. Each $R^{1a}$ is the same or different, and is $C_{1-20}$ alkyl, $C_{4-20}$ cycloalkyl, or $C_{6-24}$ aryl. For example, each $R^{1a}$ can independently be $C_{1-6}$ alkyl, $C_{4-7}$ cycloalkyl, or $C_{6-12}$ aryl.

Each $R^2$ is the same or different, and is hydrogen, $-L-(R^{2a})_q$, or $C_{1-20}$ alkyl, $C_{1-20}$ heteroalkyl, $C_{2-20}$ alkenyl, $C_{2-20}$ alkynyl, $C_{4-20}$ cycloalkyl, or $C_{6-24}$ aryl, each optionally substituted with one or more $-Si(R^{1a})_3$ groups, wherein $R^{1a}$ is as defined above. Preferably, each $R^2$ is the same or different, and is hydrogen, $-L-(R^{2a})_q$, $C_{1-6}$ alkyl, $C_{1-7}$ heteroalkyl, $C_{2-6}$ alkenyl, $C_{2-6}$ alkynyl, $C_{4-7}$ cycloalkyl, or $C_{6-12}$ aryl, each optionally substituted with one or more $-Si(R^{1a})_3$ groups. Each $R^3$ is the same or different, and is hydrogen, $C_{1-20}$ alkyl, $C_{2-20}$ alkenyl, $C_{2-20}$ alkynyl, $C_{4-20}$ cycloalkyl, or $C_{6-24}$ aryl. Preferably, each $R^3$ is the same or different, and is hydrogen or $C_{1-6}$ alkyl, $C_{1-7}$ heteroalkyl, $C_{2-6}$ alkenyl, $C_{2-6}$ alkynyl, $C_{4-7}$ cycloalkyl, or $C_{6-12}$ aryl. Each $R^4$ is the same or different, and is hydrogen or $C_{8-20}$ alkyl, $C_{8-20}$ heteroalkyl, $C_{4-20}$ cycloalkyl, or $C_{6-24}$ aryl, each optionally substituted with one or more $-Si(R^{1a})_3$ groups. Preferably, each $R^4$ is the same or different, and is hydrogen or $C_{1-6}$ alkyl, $C_{1-7}$ heteroalkyl, $C_{2-6}$ alkenyl, $C_{2-6}$ alkynyl, $C_{4-7}$ cycloalkyl, or $C_{6-12}$ aryl, each optionally substituted with one or more $-Si(R^{1a})_3$ groups, wherein $R^{1a}$ is as defined above. Each of $R^5$, $R^6$, and $R^8$ is independently hydrogen, hydroxy, $C_{1-20}$ alkyl, $C_{2-20}$ alkenyl, $C_{2-20}$ alkynyl, $-L-(R^{2a})_q$, $C_{4-20}$ cycloalkyl, or $C_{6-24}$ aryl, where L and $R^{2a}$ are as defined above. Preferably, each of $R^5$, $R^6$, and $R^8$ is independently hydrogen, hydroxy, $C_{1-6}$ alkyl, $C_{2-6}$ alkenyl, $C_{2-6}$ alkynyl, $-L-(R^{2a})_q$, $C_{4-7}$ cycloalkyl, or $C_{6-12}$ aryl. $R^7$ is hydroxy, $C_{1-20}$ alkyl, $C_{6-24}$ aryl, $C_{1-6}$ alkoxy, $C_{6-12}$ aryloxy, $-L-(R^{2a})_q$, or $-OSi(R^{1a})_3$, wherein $R^{1a}$ is as defined above. Preferably, $R^7$ is hydroxy, $C_{1-6}$ alkyl, $C_{6-12}$ aryl, $C_{1-6}$ alkoxy, $C_{6-12}$ aryloxy, $-L-(R^{2a})_q$, or $-OSi(R^{1a})_3$.

Each L is the same or different, and is $C_{2-8}$ alkylene, $C_{2-8}$ heteroalkylene, $(C_{2-8}$ alkylene)-O$(C_{2-8}$ alkylene), $C_{2-8}$ heteroalkylene-$(C(O)NH-C_{2-8}$ alkylene)$_q$, or $C_{2-8}$ alkylene-O-$C_{1-8}$alkylene-$(C(O)NH-C_{2-8}$ alkylene)$_q$, wherein q is an integer from 1 to 10. Each $R^{2a}$ is the same or different, and is hydroxy, $C_{1-6}$ alkoxy, $C_{6-12}$ aryloxy, glycidyl, glycidyl ether, 3,4-epoxycyclohexyl, $NR^{2b}R^{2c}$, or C(O)OH, wherein each of $R^{2b}$ and $R^{2c}$ are independently H or $C_{1-6}$ alkyl. For example, each $-L-(R^{2a})_q$ group can independently be $C_{2-8}$ alkylene-$(R^{2a})_{1-3}$, $C_{2-8}$ heteroalkylene-$R^{2a}$, $C_{2-8}$ alkylene-$(C(O)NH-C_{2-8}$ alkylene-$R^{2a})_2$, $C_{2-8}$ alkylene-C(O)OH, $C_{2-8}$ alkylene-$(C(O)OH)_2$, $C_{2-8}$ alkylene-O-$C_{2-8}$ alkylene-$(C(O)OH)_3$, $C_{2-8}$ alkylene-$NR^{2b}R^{2c}$, or $C_{2-8}$ alkylene-$(C(O)NH-C_{2-8}$ alkylene-$NR^{2b}R^{2c})_2$.

In formula (10), m is an integer from 0 to 100 and n is an integer from 1 to 50. For example, m can be from 0 to 100, or from 1 to 100, or from 1 to 50, or from 5 to 50, or from 10 to 50, or from 10 to 25. For example, n can be from 1 to 100, or from 5 to 50, or from 10 to 50, or from 10 to 25.

An exemplary passivation material is a compound of formula (10a)

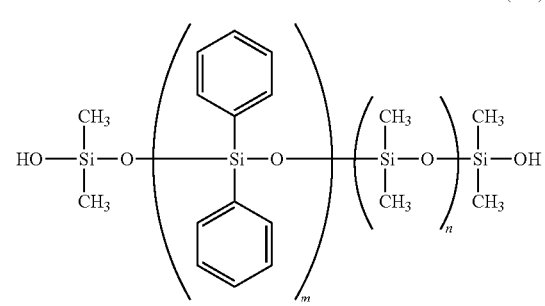

(10a)

wherein m and n are each independently an integer from 1 to 100. For example, the passivation material is a compound of formula (10b)

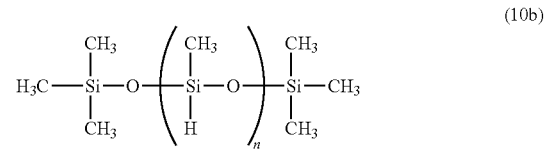

(10b)

wherein n is an integer from 1 to 100.

The thermoplastic composition can further include one or more additional passivation materials. For example, the passivation layer can be derived from one or more passivation materials. Thus, as used herein, the term "passivation material" means one or more passivation materials. The thermoplastic composition can further include an auxiliary polysiloxane that does not have a functional group that is hydride, alkoxy, aryloxy, epoxy, or amino. For example, the passivated inorganic chromophore can have a passivation layer that includes one or more polysiloxanes having at least one functional group that is hydride, hydroxy, alkoxy, aryloxy, epoxy, carboxy, amino, or a combination thereof, and one or more auxiliary polysiloxanes that do not have a functional group that is hydride, alkoxy, aryloxy, epoxy, carboxy, or amino. Exemplary auxiliary polysiloxanes may provide anti-static, flow, or anti-adhesion properties.

The passivation material can be present in an amount of 0.05 to 20 wt %, preferably 0.1 to 10 wt %, more preferably 0.5 to 5 wt %, based on the total weight of the passivated inorganic chromophore. One or more passivation materials can each be present in an amount of 0.05 to 20 wt %, or 0.1 to 10 wt %, or 0.5 to 5 wt %; the total amount of passivation material present, which includes the one or more passivation materials, can be an amount of 0.05 to 20 wt %, or 0.1 to 10 wt %, or 0.5 to 5 wt %; or the total amount of the passivation material and the auxiliary polysiloxane is from 0.05 to 20 wt %, or 0.1 to 10 wt %, or 0.5 to 5 wt %, based on the total weight of the passivated inorganic chromophore. When the thermoplastic composition is in the form of a concentrate, and the passivated inorganic chromophore is present in an amount of 5 to 50 parts by weight (pbw), preferably 10 to 50 pbw, more preferably 20 to 50 pbw, based on 100 pbw of the polymer material.

The passivation material can be prepared as disclosed in U.S. Pat. No. 9,139,770. For example, a commercially available siloxane polymer can be hydrosilylated with an alkene and an alkene-amino in sequential steps to form the passivation material of formula (10). Alternatively, a siloxane polymer can be prepared by condensation of a functionalized dichlorosilane (RSi(Cl)$_2$H) with water, where R is $R^1$, $R^2$, $R^3$, or $R^4$ as described above, followed by end-capping the terminal chloro groups of the polymer, and then catalytic hydrosilylation of the silane groups with a suitable alkene amine. For example, a bis-substituted chlorosilane can be converted to a silanol and then reacted with a siloxane polymer to form an end-capped siloxane polymer (i.e., polysiloxane). The remaining silane groups can be reacted with a suitable alkene and Karstedt's catalyst to prepare the passivation material. Exemplary nucleophiles that can be used to end-cap the terminal chloro groups include (R)$_3$SiOM, where each R is $R^5$, $R^6$, or $R^8$ as described above, and M can be hydrogen or a cation. Exemplary cations include metal and non-metal cations, such as Na$^+$ or K$^+$. The catalyst can be a transition metal catalyst such as Karstedt's catalyst, a platinum based catalyst.

The passivated inorganic chromophore can be prepared by contacting an effective amount of the passivation material and the inorganic chromophore under conditions effective to provide the passivated inorganic chromophore. Effective conditions can include a temperature from 0 to 60° C., preferably 0 to 50° C., more preferably 0 to 40° C. For example, the effective conditions can be from 150 to 400° C., preferably 150 to 350° C., more preferably 150 to 300° C. for 1 to 30 minutes (min), preferably 1 to 20 min, more preferably 1 to 10 min.

The passivation material and the inorganic chromophore can be contacted using a solvent, such as ketones, amides, aromatic hydrocarbons, ethers, esters, sulfoxides, or the like. Alternatively, the passivated inorganic chromophore can be prepared by contacting the passivation material and the inorganic chromophore in the absence of added solvent. As used herein, an "absence of added solvent" means that no solvent is deliberately added to the reactants. An added solvent does not include residual solvents that remain in either the passivation material or inorganic chromophore during their preparation.

In an example, at least two separate portions of the passivation material are separately contacted with the inorganic chromophore. For example, the first portion and the second portion each include the same amount of passivation material; or the first portion includes a passivation material and an auxiliary polysiloxane, and the second portion includes the passivation material and the auxiliary polysiloxane, wherein the amount of passivation material and auxiliary polysiloxane is the same or different in each portion.

The thermoplastic compositions can be manufactured by various methods known in the art. For example, powdered polycarbonate, and other optional components are first blended, optionally with any fillers, in a high speed mixer or by hand mixing. The blend is then fed into the throat of a twin-screw extruder via a hopper. Alternatively, at least one of the components can be incorporated into the composition by feeding it directly into the extruder at the throat or downstream through a sidestuffer, or by being compounded into a masterbatch with a desired polymer and fed into the extruder. The extruder is operated at a temperature higher than that necessary to cause the composition to flow. The extrudate can be immediately quenched in a water bath and pelletized. The pellets so prepared can be one-fourth inch long or less as desired. Such pellets can be used for subsequent molding, shaping, or forming.

An additive composition can be used, comprising one or more additives selected to achieve a desired property, with the proviso that the additive(s) are also selected so as to not significantly adversely affect a desired property of the thermoplastic composition. The additive composition or individual additives can be mixed at a suitable time during the mixing of the components for forming the composition. The additive can be soluble or non-soluble in polycarbonate. The additive composition can include an impact modifier, flow modifier, filler (e.g., a particulate polytetrafluoroethylene (PTFE), glass, carbon, mineral, or metal), reinforcing agent (e.g., glass fibers), antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g., a dye or pigment), surface effect additive (e.g., an epoxide), radiation stabilizer, flame retardant, processing agent (e.g., alkyl tosylate), anti-drip agent (e.g., a PTFE-encapsulated styrene-acrylonitrile copolymer (TSAN)), or a combination thereof. The total amount of the additive composition (other than any impact modifier, filler, or reinforcing agent) can be 0.001 to 10.0 wt %, or 0.01 to 5 wt %, each based on the total weight of the polymer in the composition. For polycarbonates, additives having a pH of from 5 to 8 are preferred.

There is considerable overlap among plasticizers, lubricants, and mold release agents, which include, for example, phthalic acid esters (e.g, octyl-4,5-epoxy-hexahydrophthalate), tris-(octoxycarbonylethyl)isocyanurate, di- or polyfunctional aromatic phosphates (e.g., resorcinol tetraphenyl diphosphate (RDP), the bis(diphenyl) phosphate of hydroquinone and the bis(diphenyl) phosphate of bisphenol A); poly-alpha-olefins; epoxidized soybean oil; silicones, including silicone oils (e.g., poly(dimethyl diphenyl siloxanes); fatty acid esters (e.g, $C_{1-32}$alkyl stearyl esters, such as methyl stearate and stearyl stearate and esters of stearic acid such as pentaerythritol tetrastearate, glycerol tristearate (GTS), and the like), waxes (e.g, beeswax, montan wax, paraffin wax, or the like), or combinations comprising at least one of the foregoing plasticizers, lubricants, and mold release agents. These are generally used in amounts of 0.01 to 5 wt %, based on the total weight of the polymer in the composition.

Heat stabilizer additives, such as phosphorous heat stabilizers, include organophosphites (e.g. triphenyl phosphite, tris-(2,6-dimethylphenyl)phosphite, tris-(mixed mono- and di-nonylphenyl)phosphite or the like), phosphonates (e.g., dimethylbenzene phosphonate or the like), phosphates (e.g., trimethyl phosphate, or the like), or combinations comprising at least one of the foregoing heat stabilizers. The heat stabilizer can be tris(2,4-di-t-butylphenyl) phosphate available as IRGAPHOS™ 168. Heat stabilizers can be used in amounts of 0.01 to 5 wt %, based on the total weight of the composition.

The thermoplastic composition can have less than 300 ppm of residual phenolic end groups, preferably less than 200 ppm of residual phenolic end groups, more preferably less than 175 ppm of residual phenolic end groups, based on the total weight of the thermoplastic composition. A lower residual phenolic end group content may provide better color stability and a thermoplastic composition having less yellowing during melt processing, and similarly resulting articles may resist aging at higher temperatures. The term "residual phenolic end groups" means phenolic end groups that are present in the polymer material or residual starting materials, including but not limited to bisphenol A.

The thermoplastic composition has a glass transition temperature ($T_g$) of 135° C. or greater, for example 135 to 180° C., 140 to 180° C., 145 to 180° C., 150 to 180° C., 155 to 180° C., 160 to 180° C., 135 to 160° C., 140 to 160° C., 135 to 155° C., or 140 to 155° C.; and a greater $M_w$ than a comparable composition comprising the polymer material and the inorganic chromophore without the passivation layer, for example 5% greater, 10% greater, 15% greater, or 20% greater, each as measured following melting at 310° C. for at least 3 minutes. For example, the composition has a $T_g$ of 135 to 180° C. and a $M_w$ of 15,000 to 60,000 g/mol.

The passivated inorganic chromophore can provide for a thermoplastic composition having desirable color properties, such as a color difference ΔE* of less than 1.0 and a color difference Δb* of less than 0, as determined using a 3.2 mm color plaque, following molding at 620° F. for 120 seconds. For example, the composition has a color difference ΔE* of 0.2 to 0.95, 0.3 to 0.95, 0.4 to 0.95, 0.5 to 0.95, 0.6 to 0.95, or 0.7 to 0.95, as determined using a 2.5 mm color plaque, following molding at 620° F. for 120 seconds. For example, the composition has a color difference Δb* of −0.1 to −0.85, −0.2 to −0.85, −0.3 to −0.85, −0.4 to −0.85, −0.5 to −0.85, or −0.2 to −0.65.

Articles comprising the thermoplastic composition are further provided. The articles including the thermoplastic composition can have a chromaticity C* of 20 to 50 units, and a hue angle h° of 225 to 315 degrees, as determined using the CIE 1976 L*C*h° color scale. For example, an article including the thermoplastic composition has a chromaticity C* of 20 to 50 units, and a hue angle h° of 225 to 315 degrees, wherein the passivated inorganic chromophore is present in the thermoplastic composition in an amount of 0.1 to 5 parts by weight, based on 100 parts by weight of the polymer material.

Shaped, formed, or molded articles comprising the thermoplastic compositions are also provided. The thermoplastic compositions can be molded into useful shaped articles by a variety of methods, such as injection molding, extrusion, rotational molding, blow molding, and thermoforming. The molded article can have a thickness from 0.1 to 5 millimeters (mm), for example 0.5 to 5 mm, 1 to 5 mm, or 2 to 5 mm. Exemplary articles include computer and business machine housings such as housings for monitors, motors, fans, power tools, handheld electronic device housings such as housings for cell phones, electrical connectors, and components of lighting fixtures, ornaments, home appliances, roofs, greenhouses, sun rooms, swimming pool enclosures, and the like. In addition, the polycarbonate compositions can be used for such applications as outdoor use where improved weatherability is desired, for example outdoor vehicles, mass transit systems, automobiles, trucks, and tractor components.

Molded articles can be prepared by contacting an effective amount of the passivation material and the inorganic chromophore to provide the passivated inorganic chromophore; combining the passivated coated inorganic chromophore and the polymer material under conditions effective to provide the thermoplastic composition; and forming the molded article from the thermoplastic composition. For example, a molded article comprising the thermoplastic composition can be formed by melt processing, such as injection molding extrusion, rotomolding, compression molding, blow molding, gas assist molding, foam molding, or a combination thereof, and at a temperature from 250 to 380° C.

This disclosure is further illustrated by the following examples, which are non-limiting.

EXAMPLES

In the examples, the materials used are presented in Table 1.

TABLE 1

| Component | Description | Source |
|---|---|---|
| PC | Linear Bisphenol A Polycarbonate, produced via interfacial polymerization, $M_w$ of about 28,100 g/mol as determined by GPC using polycarbonate standards, para-cumylphenol (PCP) end-capped (at least 99%). | SABIC |
| Siloxane A | Silane (Si—H) functional polymethyl-hydrosiloxane (DF1040) having a $M_w$ of about 1,100 g/mol, trimethyl silyl end-capped. | Momentive Performance Materials |
| Siloxane B | Polydimethyl phenyl siloxane (DF581) having a $M_w$ of about 600 g/mol, silanol end-capped. | Momentive Performance Materials |
| PETS | Pentaerythritol tetrastearate. | Lonza |
| Phosphite stabilizer | Tris(2,4-di-tert-butylphenyl) phosphite (IRGAPHOS ™ 168). | Ciba Specialties Chemicals Corp. |
| YInMn | YInMn Blue 10G513. | Shepherd Color |

Physical Measurements

Weight average molecular weight ($M_w$, g/mol) and number average molecular weight ($M_n$, g/mol) were determined by size exclusion GPC calibrated using polycarbonate standards. $T_g$ (° C.) was determined by differential scanning calorimetry (DSC) with a start temperature of 40° C., ramp rate of 20° C./min to 250° C., and measured on second heating. MVR ($cm^3$/10 min) was tested per ASTM D1238 at 300° C. with a 1.2 kg load and a dwell time of 360 s or 1080 s.

Color scale was obtained using a color spectrophotometer Color Eye 7000A (X-Rite Incorporated). The instrument, equipped in standard with integrating sphere 8°/diffuse geometry, was used to measure color of each specimen as described in standard practice ASTM E308. Before measurement, the instrument was calibrated using the standard white calibration tile provided with the instrument. The UV filter position was also calibrated according to the MacBeth CE7000A manual in order to simulate a D65 light source (UVD65 setting). All measurements (reflectance and transmission mode) were taken with the specular component of light included (SCI), UV included and calibrated (UVD65), a large viewing aperture (LAV) and a large viewing area (LAV). Color scale was calculated by the X-Rite iQC9 software for several color spaces from the spectral curve taken between 360 nm and 750 nm for a 10 degree observer using the CIE 1976 L*a*b* (i.e. L* a* b*) and CIE 1976 LCh (i.e. C* h°). C* is chromaticity and refers to saturation and h° is the hue angle in degrees and refers to color. Color differences (i.e. ΔL* Δa* Δb*ΔE*) were calculated versus the plaque of the same composition molded at 620° F. with a 120 second cycle time using the CIE L*a*b* color scale measured for each sample. Color differences are reported as: L=Lighter; G=Green shifted; Y=Yellow shifted; B=Blue shifted; or R=Red shifted. Color differences were determined according to ASTM D2244. Torque was taken directly from the 30 mm Werner & Pfleiderer twin screw extruder following calibration involving machine maximum power corresponding to 100% torque.

Phenolic OH end groups were determined by phosphorus functionalization of end groups. A sample was dissolved in $CDCl_3$ with pyridine and chromium (III) acetylacetonate; trichlorophenol was used as a standard. The active phosphorylating agent, which derivatized the phenolic OH group functionality into phosphorus containing species, was o-phenylene phosphorochloridite. The solutions were allowed to react for at least 15 minutes, converted into their phosphorus derivatives and analyzed by NMR (nuclear magnetic resonance). Phosphorus 31 isotope signals were observed and quantified against the trichlorophenol standard.

Sample Preparation

The compositions were prepared as follows. The polycarbonate (PC) was blended, along with the other components listed in Tables 2 and 4 below, and then extruded using a twin screw extruder. The zone temperatures were set at 350° F., 500° F., 520° F., 540° F., and 560° F., with screw speed and output of 460 rpm. The extruded product was subsequently pelletized. After extrusion and drying for greater than 2 hours at 125° C., the pelletized material was injection molded using a Demag 90T molding machine with a barrel temperature of 580° F. with a standard cycle time of about 35 seconds to form plaques with the following dimensions: 5.08 cm (width)×7.62 cm (height)×2.5 mm (thickness). The procedure was then repeated with a barrel temperature of 620° F. with a cycle time of about 120 seconds (i.e. abusive molding). The polymer melt shot size was about 1.5 mm, the cushion was 0.21 mm, and injection hold was 1.5 seconds. The average residence time of the polymer in the molten state was between 2 and 8 minutes.

Comparative Examples C1 to C7

The physical properties of molded compositions prepared with unpassivated YInMn and controls were prepared and evaluated as shown in Table 2.

TABLE 2

| Component | Unit | C1 | C2 | C3 | C4 | C5 | C6 | C7 |
|---|---|---|---|---|---|---|---|---|
| PC | parts by weight (pbw) | 100 | 100 | 100 | 100 | 100 | 100 | 100 |
| Phosphite stabilizer | pbw | 0.06 | 0.06 | 0.06 | 0.06 | 0.06 | 0.06 | 0.06 |
| PETS | pbw | 0.27 | 0.27 | 0.27 | 0.27 | 0.27 | 0.27 | 0.27 |
| YInMn unpassivated | pbw | — | 0.01 | 0.05 | 0.1 | 0.3 | 0.5 | 1.0 |
| Properties | | | | | | | | |
| MVR 300° C.-360 s | $cm^3$/10 min | 9.45 | 10.5 | 14.3 | 14.7 | 16.2 | 18.4 | 23.8 |
| MVR 300° C.-1080 s | $cm^3$/10 min | 9.81 | 10.55 | 13.87 | 14.05 | 16.15 | 18.52 | 23.6 |
| $M_w$ | g/mol | 27694 | 27559 | 26032 | 25343 | 25461 | 24417 | 22570 |
| % $M_w$ loss vs C1 | | — | 0.5% | 6.0% | 8.5% | 8.1% | 11.8% | 18.5% |
| $T_g$ | ° C. | 150.4 | 149.2 | 148.8 | 147.7 | 148.8 | 147.4 | 146.7 |

Table 2 shows the results obtained for Comparative Examples C1 to C7. C1 is a polycarbonate composition without the YInMn component whereas C2 to C7 have increasing amounts of the unpassivated YInMn component. Increasing the amount of unpassivated YInMn in the molded compositions resulted in an increase in MVR, and a decrease in both $M_w$ and $T_g$. C2 to C7 showed a loss in $M_w$ in an amount from 6 to 19% compared to $C_1$. The properties of molded polycarbonate compositions having the unpassivated YInMn component were inferior to the properties of the polycarbonate composition without YInMn. The loss in $M_w$ and color shift (yellowing) both increase with increased time at processing temperature. Higher loading (>0.1 wt %) of the unpassivated YInMn pigment and higher melt temperature (280 to 380° C.) exposure for longer periods of time (>5 minutes) can also lead to more degradation and color shift.

Passivation of Inorganic Chromophore

The inorganic chromophore (YInMn) was passivated using one or more passivation materials, as specified in Table 3 below.

TABLE 3

| Passivation Material | Pigment (wt %) | Siloxane A (wt %) | Siloxane B (wt %) | Total Passivation (wt %) |
|---|---|---|---|---|
| A | 98 | 2 | — | 2 |
| AB | 96 | 2 | 2 | 4 |

The passivated inorganic chromophores were prepared as follows. A first portion (50 wt %) of the passivation material was added to the inorganic chromophore and dispersed using a high-speed mixer for about 40 seconds. A second portion (50 wt %) of the passivation material (Siloxane A and/or Siloxane B) was then added to the inorganic chromophore and dispersed using a high-speed mixer for about 40 seconds. The resulting passivated inorganic chromophores were used in the compositions as specified in Table 4 below.

Comparative Examples C8 to C11 and Examples E1 to E2

Example 1 (E1) was prepared according to the sample preparation procedure above including 1 wt % of YInMn passivated with 2 wt % Siloxane A (YInMn-A). Example 2 (E2) was prepared according to the same preparation procedure above including 1 wt % of YInMn passivated with 2 wt % Siloxane A and 2 wt % Siloxane B (YInMn-AB).

The physical properties of molded compositions prepared with passivated YInMn and controls were evaluated as shown in Table 4.

TABLE 4

| Component | Unit | C8 | C9 | C10 | C11 | E1 | E2 |
|---|---|---|---|---|---|---|---|
| PC | (pbw) | 100 | 100 | 100 | 100 | 100 | 100 |
| Phosphite stabilizer | pbw | 0.06 | 0.06 | 0.06 | 0.06 | 0.06 | 0.06 |
| PETS | pbw | 0.27 | 0.27 | 0.27 | 0.27 | 0.27 | 0.27 |
| Siloxane A | pbw | — | 0.02 | 0.02 | — | — | — |
| Siloxane B | pbw | — | — | 0.02 | — | — | — |
| YInMn-A | pbw | — | — | — | — | 1.0 | — |
| YInMn-AB | pbw | — | — | — | — | — | 1.0 |
| YInMn unpassivated | pbw | — | — | — | 1.0 | — | — |
| Properties | | | | | | | |
| $M_w$ | g/mol | 29965 | 29852 | 29828 | 23681 | 28579 | 28834 |
| $M_n$ | g/mol | 12711 | 12646 | 12698 | 10537 | 12109 | 12265 |
| % Mw loss vs. C8 | | — | 0.4% | 0.5% | 21.0% | 4.6% | 3.8% |
| MVR 6 min 300° C. | cc/10 min | 6.3 | 6.6 | 6.5 | 21.6 | 8.3 | 8.3 |
| MVR 18 mm 300° C. | Cc/10 mm | 6.4 | 6.9 | 6.7 | 21.9 | 8.8 | 8.6 |
| $T_g$ | ° C. | 151.1 | 150.4 | 150.8 | 148.7 | 150.5 | 150.7 |
| Phenolic OH end groups | ppm | 103 | 108 | 101 | 862 | 245 | 160 |

Table 4 shows the results obtained for E1 to E2 and C8 to C11. The compositions in E1 and E2 included the passivated YInMn component, whereas C11 was a composition with 1 wt % of unpassivated YInMn. The molecular weights, MVR at 300° C. for 6 and 18 minutes, amount of residual phenolic end groups, and $T_g$ were compared. Using C8 as a control the passivated YInMn pigment in E1 and E2 showed less than 5% loss in $M_w$ compared to the unpassivated YInMn pigment in C11, which had a 21% loss of Mw. The increase in MVR in C11 to over 20 cm³/10 minutes was also consistent with degradation of the polycarbonate caused by the unpassivated YInMn pigment. C11 also had a depressed $T_g$ compared to C8 that did not include YInMn. Retention of physical properties is observed with E1 and E2 as compared to C8. Suitable fire retardance properties may also be found with PC containing passivated YInMn.

Color and Abusive Molding

Color scale for molded plaques derived from the compositions of E1 to E2 and C8 to C11 were evaluated as shows in Table 5.

TABLE 5

| Sample | Molding Temperature (° F.) | L* | a* | b* | C* | h° | DL* | Da* | Db* | DE* |
|---|---|---|---|---|---|---|---|---|---|---|
| C8  | 580 | 95.63 | −0.19 | 1.02   | 1.04  | 100.31 | —     | —       | —       | —    |
| C8  | 620 | 95.66 | −0.23 | 1.07   | 1.09  | 102.01 | 0.02 L | −0.04 G | 0.05 Y  | 0.07 |
| C9  | 580 | 93.77 | −0.06 | 2.44   | 2.44  | 91.34  | —     | —       | —       | —    |
| C9  | 620 | 94.15 | −0.13 | 2.27   | 2.27  | 93.34  | 0.38 L | −0.08 G | −0.17 B | 0.42 |
| C10 | 580 | 92.21 | 0.09  | 3.12   | 3.12  | 88.27  | —     | —       | —       | —    |
| C10 | 620 | 92.73 | −0.04 | 3.12   | 3.12  | 90.82  | 0.52 L | −0.14 G | 0       | 0.54 |
| C11 | 580 | 33.45 | 10.46 | −35.41 | 36.92 | 286.46 | —     | —       | —       | —    |
| C11 | 620 | 33.42 | 9.79  | −34.57 | 35.93 | 285.82 | −0.03 D | −0.67 G | 0.84 Y | 1.08 |
| E1  | 580 | 33.6  | 11.34 | −36.62 | 38.33 | 287.21 | —     | —       | —       | —    |
| E1  | 620 | 33.67 | 11.83 | −37.43 | 39.25 | 287.54 | 0.06 L | 0.49 R  | −0.81 B | 0.95 |
| E2  | 580 | 33.81 | 11.75 | −37.41 | 39.21 | 287.43 | —     | —       | —       | —    |
| E2  | 620 | 33.82 | 12.14 | −38.03 | 39.92 | 287.7  | 0     | 0.39 R  | −0.62 B | 0.74 |

As shown in Table 5, compositions including passivated YInMn (E1 and E2) showed less overall color change after abusive molding compared to the composition including unpassivated YInMn (C11). The results indicate that retention of blue color can be obtained by passivation of the inorganic chromophore.

Extrusion Torque

Compositions derived from E1 and E2 and C8 to C11 were extruded as described above. Table 6 shows the results of torque measurements (% of initial torque) taken at two minute intervals during extrusion.

TABLE 6

| Time (min) | C8 | C9 | C10 | C11 | E1 | E2 |
|---|---|---|---|---|---|---|
| 2  | 90 | 87 | 85 | 73 | 79 | 75 |
| 4  | 91 | 90 | 81 | 73 | 86 | 78 |
| 6  | 92 | 91 | 83 | 75 | 86 | 79 |
| 8  | 92 | 89 | 83 | 74 | 85 | 81 |
| 10 | 91 | 89 | 84 | 71 | 87 | 80 |
| 12 | 92 | 88 | 82 | 73 | 84 | 81 |
| 14 | 91 | 89 | 84 | 70 | 82 | 78 |
| 16 | 92 | 88 | 82 | 70 | 84 | 77 |

As shown in Table 6, torque values were obtained as a percentage of the initial torque, and is a relative measurement of the energy needed for melt processing a given amount of material in an extruder for a given set of conditions (e.g., machine size, screw configuration, screw speed, feed rate, and temperature). A reduction in torque relative to initial torque denotes a lower resin viscosity and is consistent with resin degradation caused by the unpassivated YInMn pigment, as confirmed by loss of molecular weight ($M_w$) in Tables 2 and 4.

This disclosure further encompasses the following aspects.

Aspect 1. A thermoplastic composition comprising: a polymer material; and a passivated inorganic chromophore comprising an inorganic chromophore and a passivation layer, wherein the inorganic chromophore has the formula: $AM_{1-x}M'_xM''_yO_{3+y}$, wherein A is Sc, Y, Gd, Tb, Dy, Ho, Eu, Er, Tm, Yb, Lu, Al, Zn, In, Ga, Ti, Sn, Fe, Mg, or a combination thereof; M is Sc, Y, Gd, Tb, Dy, Ho, Eu, Er, Tm, Yb, Lu, Al, In, Ga, Fe, Mn, or a combination thereof, or M is a 1:1 mixture of MA and MB cations where MA is Zn, Mg, or Cu, and MB is Ti or Sn; M' is Mn, Fe, Al, Ga, In, or a combination thereof, M' is a +3 cation, and at least some $M^{3+}$ cations are bound to oxygen in trigonal bipyramidal coordination as $M'O_5$; M'' is Mg, Zn, Cu, or a combination thereof; $0 < x \leq 0.8$; y is an integer of 0 to 15; at least one of M and M' comprises Al, Ga, or In; and when y=0, M' is Mn, A is Y, Gd, Tb, Dy, Ho, Eu, Er, Tm, Yb, Lu, or a combination thereof, and M is not Al, and wherein the passivation layer is derived from a passivation material comprising a polysiloxane having at least one functional group that is hydride, hydroxy, alkoxy, aryloxy, epoxy, carboxy, amino, or a combination thereof.

Aspect 2. The thermoplastic composition of aspect 1, wherein the polymer material comprises a polyester, a polycarbonate, a polysiloxane, a polystyrene, a poly(meth)acrylate, a polyacrylonitrile, a polybutadiene, a blend thereof, a copolymer thereof, or a combination thereof.

Aspect 3. The thermoplastic composition of aspect 1 or 2, wherein the inorganic chromophore is $YIn_{1-x}Mn_xO_3$, $DyIn_{1-x}Mn_xO_3$, $HoIn_{1-x}Mn_xO_3$, $ErIn_{1-x}Mn_xO_3$, $YSc_{1-x}Mn_xO_3$, $YFe_{1-x}In_xO_3$, $LuGa_{1-x}Mn_xMgO_4$, $ScAl_{1-x}Mn_xZnO_4$, $ScAl_{1-x}Mn_xMgO_4$, $InGa_{1-x}Mn_xZnO_4$, $InGa_{1-x}Mn_xMgO_4$, $ScGa_{1-x}Mn_xZnO_4$, $ScGa_{1-x}Mn_xMgO_4$, $LuGa_{1-x}Mn_xZnO_4$, $LuGa_{1-x}Mn_xMgO_4$, $LuGa_{1-x}Mn_xZn_2O_5$, $Y(Cu,Ti)_{1-x}Al_xO_3$, $Y(Cu,Ti)_{1-x}Ga_xO_3$, $Y(Cu,Ti)_{1-x}In_xO_3$, $Y(Cu,Ti)_{1-x}Fe_xO_3$, $Yb(Cu,Ti)_{1-x}Mn_xO_3$, $Lu(Cu,Ti)_{1-x}Mn_xO_3$, $Y(Fe,In)_{1-x}Mn_xO_3$, $Y(Mn,In)_{1-x}Fe_xO_3$, $(Y,Eu)Mn_{1-x}In_xO_3$, $In(In,Ga)_{1-x}Mn_xMgO_4$, or $Y(Ga, In)_{1-x}Mn_xO_3$.

Aspect 4. The thermoplastic composition of any one or more of aspects 1 to 3, wherein the inorganic chromophore is of a formula a provided herein.

Aspect 5. The thermoplastic composition of any one or more of aspects 1 to 4, wherein A is Y, M is In, M' is Mn, and y is 0.

Aspect 6. The thermoplastic composition of any one or more of aspects 1 to 5, wherein the passivated inorganic chromophore is present in an amount of 0.01-50 wt %, preferably 0.05-10 wt %, more preferably 0.1-2.5 wt %, based on composition weight.

Aspect 7. The thermoplastic composition of any one or more of aspects 1 to 6, wherein the passivated inorganic chromophore is present in an amount of 5-50 pbw.

Aspect 8. The thermoplastic composition of any one or more of aspects 1 to 7, wherein the passivation layer is derived from a passivation material of formula (10), wherein $R^1$, $R^{1a}$, $R^2$, $R^{2a}$, $R^{2b}$, $R^{2c}$, $R^3$, $R^4$, $R^5$, $R^6$, $R^7$, $R^8$, L, m, n, n, and q are as provided herein.

Aspect 9. The thermoplastic composition of any one or more of aspects 1 to 8, wherein the passivation material is a compound of the formula (10a), wherein m and n are each independently an integer from 1-100.

Aspect 10. The thermoplastic composition of any one or more of aspects 1 to 9, wherein the passivation material is a compound of the formula (10b), wherein n is an integer from 1-100.

Aspect 11. The thermoplastic composition of any one or more of aspects 1 to 10, wherein the passivation material is present in an amount of 0.05-20 wt %, preferably 0.1-10 wt %, more preferably 0.5-5 wt %, based on the weight of the passivated chromophore.

Aspect 12. The thermoplastic composition of any one or more of aspects 1 to 11, further comprising an auxiliary polysiloxane, wherein the auxiliary polysiloxane does not comprise a functional group that is hydride, alkoxy, aryloxy, epoxy, carboxy, or amino.

Aspect 13. The thermoplastic composition of any one or more of aspects 1 to 12, further comprising 0.01 to 2 weight percent of a phosphorus heat stabilizer, based on the total weight of the composition.

Aspect 14. The thermoplastic composition of any one or more of aspects 1 to 13, having less 300 ppm, preferably less than 200 ppm, more preferably less than 175 ppm of residual phenolic OH end groups, based on the total weight of the composition; a weight average molecular weight of 15,000-60,000 g/mol, as measured by GPC using polycarbonate standards; and a glass transition temperature of 135° C. or greater.

Aspect 15. The thermoplastic composition of any one or more of aspects 1 to 14, wherein the composition has a greater weight average molecular weight than a comparable composition comprising the polymer material and the inorganic chromophore without the passivation layer, each as measured following melting at 310° C. for at least 3 minutes.

Aspect 16. The thermoplastic composition of any one or more of aspects 1 to 15, wherein the composition has a color difference $\Delta E^*$ of less than 1.0, as determined using a 3.2 mm color plaque, following molding at 620° F. for 120 s; and a color difference $\Delta b^*$ of less than 0, as determined using a 3.2 mm color plaque, following molding at 620° F. for 120 s.

Aspect 17. A method of forming the thermoplastic composition of any one or more of aspects 1 to 16, the method comprising: contacting an effective amount of the passivation material and the inorganic chromophore under conditions effective to provide the passivated inorganic chromophore; and combining the passivated inorganic chromophore and the polymer material under conditions effective to provide the thermoplastic composition.

Aspect 18. The method of aspect 17, wherein at least two portions of the passivation material are separately contacted with the inorganic chromophore.

Aspect 19. The method of aspect 17 or 18 wherein the passivation material and the inorganic chromophore are contacted in the absence of an added solvent.

Aspect 20. An article comprising the thermoplastic composition of any one or more of aspects 1 to 16, or prepared by the method of any one or more of aspects 17 to 19, wherein the article has a chromaticity C* of 20-50 units, and a hue angle h° of 225-315°, as determined using the CIE 1976 L*C*h° color scale.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other (e.g., ranges of "up to 25 wt %, or, more specifically, 5 wt % to 20 wt %," is inclusive of the endpoints and all intermediate values of the ranges of "5 wt % to 25 wt %," etc.). The terms "a" and "an" and "the" do not denote a limitation of quantity, and are to be construed to cover both the singular and the plural, unless otherwise indicated herein or clearly contradicted by context. "Or" means "and/or" unless clearly stated otherwise. "Combination thereof" includes one or more of the listed components, and possibly others.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkynyl" means a straight or branched chain, monovalent hydrocarbon group having at least one carbon-carbon triple bond. "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, —C$_n$H$_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. "Aryloxy" means an aryl group that is linked via an oxygen (i.e., aryl-O—), for example phenoxy. "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one member that is a heteroatom (e.g., 1, 2, or 3 heteroatom(s)), wherein the heteroatom(s) is each independently N, O, S, Si, or P. As used herein, "hydride" means to a silicon-hydrogen bond (e.g., Si—H). "Epoxy" means an oxirane group, for example glycidyl, glycidyl ether, glycidyl ester, and 3,4-epoxycylohexyl. "Amino" means to a primary, secondary, or tertiary amine of the formula —NR$_2$, wherein each R is the same or different and is hydrogen or C$_{1-6}$ alkyl. "Carboxy" means a carboxylic acid group of the formula —C(O)OH. "Hydroxy" includes, but is not limited to, Si—OH.

Unless substituents are otherwise specifically indicated, each of the foregoing groups can be unsubstituted or substituted, provided that the substitution does not significantly adversely affect synthesis, stability, or use of the compound. "Substituted" means that the compound, group, or atom is substituted with at least one (e.g., 1, 2, 3, or 4) substituents instead of hydrogen, where each substituent is independently nitro (—NO$_2$), cyano (—CN), hydroxy (—OH), halogen, thiol (—SH), thiocyano (—SCN), C$_{1-6}$ alkyl, C$_{2-6}$ alkenyl, C$_{2-6}$ alkynyl, C$_{1-6}$ haloalkyl, C$_{1-9}$ alkoxy, C$_{1-6}$ haloalkoxy, C$_{3-12}$ cycloalkyl, C$_{5-18}$ cycloalkenyl, C$_{6-12}$ aryl, C$_{7-13}$ arylalkylene (e.g., benzyl), C$_{7-12}$ alkylarylene (e.g., toluyl), C$_{4-12}$ heterocycloalkyl, C$_{3-12}$ heteroaryl, C$_{1-6}$ alkyl sulfonyl (—S(═O)$_2$-alkyl), C$_{6-12}$ arylsulfonyl (—S(═O)$_2$-aryl), or tosyl (CH$_3$C$_6$H$_4$SO$_2$—), provided that the substituted atom's normal valence is not exceeded, and that the substitution does not significantly adversely affect the manufacture, stability, or desired property of the compound. The number of carbon atoms indicated in a group is exclusive of any substituents. For example —CH$_2$CH$_2$CN is a C$_2$ alkyl group substituted with a nitrile.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A thermoplastic composition comprising:
   a polymer material comprising polycarbonate; and
   a passivated inorganic chromophore comprising an inorganic chromophore and a passivation layer, wherein the inorganic chromophore has a formula:

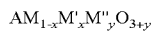
   $$AM_{1-x}M'_xM''_yO_{3+y}$$

wherein
   A is Sc, Y, Gd, Tb, Dy, Ho, Eu, Er, Tm, Yb, Lu, Al, Zn, In, Ga, Ti, Sn, Fe, Mg, or a combination thereof;
   M is Sc, Y, Gd, Tb, Dy, Ho, Eu, Er, Tm, Yb, Lu, Al, In, Ga, Fe, Mn, or a combination thereof, or M is a 1:1 mixture of MA and MB cations where MA is Zn, Mg, or Cu, and MB is Ti or Sn;
   M' is Mn, Fe, Al, Ga, In, or a combination thereof, M' is a +3 cation, and at least some M'$^{3+}$ cations are bound to oxygen in trigonal bipyramidal coordination as M'O$_5$;
   M'' is Mg, Zn, Cu, or a combination thereof;
   0<x≤0.8;
   y is an integer of 0 to 15;
   at least one of M and M' comprises Al, Ga, or In; and
   when y=0, M' is Mn, A is Y, Gd, Tb, Dy, Ho, Eu, Er, Tm, Yb, Lu, or a combination thereof, and M is not Al,
   wherein the passivation layer is derived from a passivation material comprising a polysiloxane having at least one functional group that is hydride, hydroxy, alkoxy, aryloxy, epoxy, carboxy, amino, or a combination thereof, and
   wherein the thermoplastic composition has less than 300 parts per million of residual phenolic OH end groups, based on the total weight of the composition, and an article formed from the composition has a chromaticity C* of 38 to 50 units, and a hue angle h° of 287 to 315 degrees, as determined using the CIE 1976 L*C*h° color scale.

2. The thermoplastic composition of claim 1, wherein the polymer material further comprises a polyester, a polysiloxane, a polystyrene, a poly(meth)acrylate, a polyacrylonitrile, a polybutadiene, a blend thereof, a copolymer thereof, or a combination thereof.

3. The thermoplastic composition of claim 1, wherein the inorganic chromophore is YIn$_{1-x}$Mn$_x$O$_3$, DyIn$_{1-x}$Mn$_x$O$_3$, HoIn$_{1-x}$Mn$_x$O$_3$, ErIn$_{1-x}$Mn$_x$O$_3$, YSc$_{1-x}$Mn$_x$O$_3$, YFe$_{1-x}$In$_x$O$_3$, LuGa$_{1-x}$Mn$_x$MgO$_4$, ScAl$_{1-x}$Mn$_x$ZnO$_4$, ScAl$_{1-x}$Mn$_x$MgO$_4$, InGa$_{1-x}$Mn$_x$ZnO$_4$, InGa$_{1-x}$Mn$_x$MgO$_4$, ScGa$_{1-x}$Mn$_x$ZnO$_4$, ScGa$_{1-x}$Mn$_x$MgO$_4$, LuGa$_{1-x}$Mn$_x$ZnO$_4$, LuGa$_{1-x}$Mn$_x$MgO$_4$, LuGa$_{1-x}$Mn$_x$Zn$_2$O$_5$, Y(Cu,Ti)$_{1-x}$Al$_x$O$_3$, Y(Cu,Ti)$_{1-x}$Ga$_x$O$_3$, Y(Cu,Ti)$_{1-x}$In$_x$O$_3$, Y(Cu,Ti)$_{1-x}$Fe$_x$O$_3$, Yb(Cu,Ti)$_{1-x}$Mn$_x$O$_3$, Lu(Cu,Ti)$_{1-x}$Mn$_x$O$_3$, Y(Fe,In)$_{1-x}$Mn$_x$O$_3$, Y(Mn,In)$_{1-x}$Fe$_x$O$_3$, (Y,Eu)Mn$_{1-x}$In$_x$O$_3$, In(In,Ga)$_{1-x}$Mn$_x$MgO$_4$, or Y(Ga,In)$_{1-x}$Mn$_x$O$_3$.

4. The thermoplastic composition of claim 1, wherein the inorganic chromophore is YIn$_{0.95}$Mn$_{0.05}$O$_3$, YIn$_{0.9}$Mn$_{0.1}$O$_3$, YIn$_{0.85}$Mn$_{0.15}$O$_3$, YIn$_{0.8}$Mn$_{0.2}$O$_3$, YIn$_{0.75}$Mn$_{0.25}$O$_3$, YIn$_{0.7}$Mn$_{0.3}$O$_3$, YIn$_{0.65}$Mn$_{0.35}$O$_3$, YIn$_{0.6}$Mn$_{0.4}$O$_3$, YIn$_{0.55}$Mn$_{0.45}$O$_3$, YIn$_{0.5}$Mn$_{0.5}$O$_3$, DyIn$_{0.9}$Mn$_{0.1}$O$_3$, DyIn$_{0.8}$Mn$_{0.2}$O$_3$, DyIn$_{0.7}$Mn$_{0.3}$O$_3$, DyIn$_{0.6}$Mn$_{0.4}$O$_3$, DyIn$_{0.5}$Mn$_{0.5}$O$_3$, HoIn$_{0.9}$Mn$_{0.1}$O$_3$, HoIn$_{0.8}$Mn$_{0.2}$O$_3$, HoIn$_{0.7}$Mn$_{0.3}$O$_3$, HoIn$_{0.5}$Mn$_{0.5}$O$_3$, ErIn$_{0.9}$Mn$_{0.1}$O$_3$, ErIn$_{0.8}$Mn$_{0.2}$O$_3$, ErIn$_{0.5}$Mn$_{0.5}$O$_3$, YGa$_{0.1}$In$_{0.8}$Mn$_{0.1}$O$_3$, YGa$_{0.1}$In$_{0.7}$Mn$_{0.2}$O$_3$, YGa$_{0.1}$In$_{0.6}$Mn$_{0.3}$O$_3$, YFe$_{0.1}$In$_{0.8}$Mn$_{0.1}$O$_3$, YFe$_{0.2}$In$_{0.7}$Mn$_{0.1}$O$_3$, YFe$_{0.3}$In$_{0.6}$Mn$_{0.1}$O$_3$, YFe$_{0.1}$In$_{0.7}$Mn$_{0.2}$O$_3$, YFe$_{0.2}$In$_{0.6}$Mn$_{0.2}$O$_3$, YFe$_{0.1}$In$_{0.6}$Mn$_{0.3}$O$_3$, YFe$_{0.2}$In$_{0.5}$Mn$_{0.3}$O$_3$, YFe$_{0.3}$In$_{0.4}$Mn$_{0.3}$O$_3$, YFe$_{0.1}$In$_{0.5}$Mn$_{0.4}$O$_3$, YFe$_{0.2}$In$_{0.4}$Mn$_{0.4}$O$_3$, Y$_{1.95}$Er$_{0.05}$Mn$_{0.25}$In$_{0.75}$O$_3$, Y$_{1.9}$Er$_{0.1}$Mn$_{0.25}$In$_{0.75}$O$_3$, LuGa$_{0.99}$Mn$_{0.01}$MgO$_4$, LuGa$_{0.97}$Mn$_{0.03}$MgO$_4$, LuGa$_{0.95}$Mn$_{0.05}$MgO$_4$, LuGa$_{0.90}$Mn$_{0.10}$MgO$_4$, LuGa$_{0.85}$Mn$_{0.15}$MgO$_4$, LuGa$_{0.97}$Mn$_{0.03}$ZnO$_4$, LuGa$_{0.95}$Mn$_{0.05}$ZnO$_4$, ScAl$_{0.99}$Mn$_{0.01}$MgO$_4$, ScAl$_{0.95}$Mn$_{0.05}$MgO$_4$, ScAl$_{0.90}$Mn$_{0.95}$MgO$_4$, ScAl$_{0.85}$Mn$_{0.15}$MgO$_4$, ScAl$_{0.95}$Mn$_{0.05}$ZnO$_4$, InGa$_{0.95}$Mn$_{0.05}$MgO$_4$, ScGa$_{0.95}$Mn$_{0.05}$ZnO$_4$, ScGa$_{0.95}$Mn$_{0.05}$MgO$_4$, LuGa$_{0.99}$Mn$_{0.01}$ZnO$_4$, LuGa$_{0.95}$Mn$_{0.05}$ZnO$_4$, In(In$_{0.2}$Ga$_{0.8}$)$_{0.95}$Mn$_{0.05}$MgO$_4$, LuGa$_{0.99}$Mn$_{0.01}$Zn$_2$O$_5$, LuGa$_{0.95}$Mn$_{0.05}$Zn$_2$O$_5$, In(In$_{0.2}$Ga$_{0.8}$)$_{0.95}$Mn$_{0.05}$MgO$_4$, Y$_{1.95}$Eu$_{0.95}$Mn$_{0.25}$In$_{0.75}$O$_3$, or Y$_{1.9}$Eu$_{0.1}$Mn$_{0.25}$In$_{0.75}$O$_3$.

5. The thermoplastic composition of claim 1, wherein A is Y, M is In, M' is Mn, and y is 0.

6. The thermoplastic composition of claim 1, wherein the passivated inorganic chromophore is present in an amount of 0.01 to 50 weight percent, based on the total weight of the thermoplastic composition.

7. The thermoplastic composition of claim 1, wherein the passivation material is present in an amount of 0.05 to 20 wt %, based on total weight of the passivated inorganic chromophore.

8. The thermoplastic composition of claim 1, wherein the passivation layer is derived from a passivation material of formula

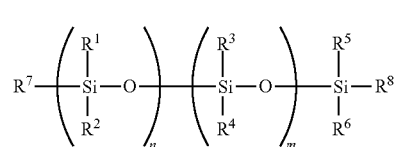

wherein
each R$^1$ is the same or different, and is hydrogen, C$_{1-20}$ alkyl, C$_{1-20}$ heteroalkyl, C$_{2-20}$ alkenyl, C$_{2-20}$ alkynyl, C$_{4-20}$ cycloalkyl, or C$_{6-24}$ aryl, each optionally substituted with one or more —Si(R$^{1a}$)$_3$ groups;
each R$^{1a}$ is the same or different, and is C$_{1-20}$ alkyl, C$_{4-20}$ cycloalkyl, or C$_{6-24}$ aryl;

each $R^2$ is the same or different, and is hydrogen, -L-$(R^{2a})_q$, or $C_{1-20}$ alkyl, $C_{1-20}$ heteroalkyl, $C_{2-20}$ alkenyl, $C_{2-20}$ alkynyl, $C_{4-20}$ cycloalkyl, or $C_{6-24}$ aryl, each optionally substituted with one or more —$Si(R^{1a})_3$ groups;

each L is the same or different, and is $C_{2-8}$ alkylene, $C_{2-8}$ heteroalkylene, ($C_{2-8}$ alkylene)-O—($C_{2-8}$ alkylene), $C_{2-8}$ heteroalkylene-(C(O)NH—$C_{2-8}$ alkylene)$_q$, or $C_{2-8}$ alkylene-O—$C_{1-8}$ alkylene-(C(O)NH—$C_{2-8}$ alkylene)$_q$;

each $R^{2a}$ is the same or different, and is hydroxy, $C_{1-6}$ alkoxy, $C_{6-12}$ aryloxy, glycidyl, glycidyl ether, 3,4-epoxycyclohexyl, $NR^{2b}R^{2c}$, or C(O)OH, wherein each of $R^{ab}$ and $R^{2c}$ are independently H or $C_{1-6}$ alkyl;

each $R^3$ is the same or different, and is hydrogen, $C_{1-20}$ alkyl, $C_{2-20}$ alkenyl, $C_{2-20}$ alkynyl, $C_{4-20}$ cycloalkyl, or $C_{6-24}$ aryl;

each $R^4$ is the same or different, and is hydrogen or $C_{8-20}$ alkyl, $C_{8-20}$ heteroalkyl, $C_{4-20}$ cycloalkyl, or $C_{6-24}$ aryl, each optionally substituted with one or more —Si$(R^{1a})_3$ groups;

each of $R^5$, $R^6$, and $R^8$ is independently hydrogen, hydroxy, $C_{1-20}$ alkyl, $C_{2-20}$ alkenyl, $C_{2-20}$ alkynyl, -L-$(R^{2a})_q$, $C_{4-20}$ cycloalkyl, or $C_{6-24}$ aryl;

$R^7$ is hydroxy, $C_{1-20}$ alkyl, $C_{6-24}$ aryl, $C_{1-6}$ alkoxy, $C_{6-12}$ aryloxy, -L-$(R^{2a})_q$, or $OSi(R^{1a})_3$;

m is an integer from 0 to 100;

n is an integer from 5 to 100; and q is an integer from 1 to 10.

9. The thermoplastic composition of claim 1, wherein the passivation material is a compound of formula

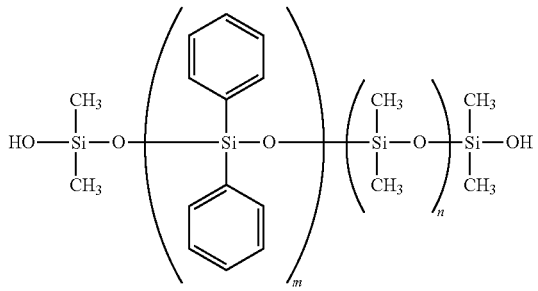

wherein m and n are each independently an integer from 1 to 100.

10. The thermoplastic composition of claim 1, further comprising an auxiliary polysiloxane, wherein the auxiliary polysiloxane does not comprise a functional group that is hydride, alkoxy, aryloxy, epoxy, carboxy, or amino.

11. The thermoplastic composition of claim 1, further comprising 0.01 to 2 weight percent of a phosphorus heat stabilizer, based on the total weight of the thermoplastic composition.

12. The thermoplastic composition of claim 1, wherein:
the polymer material comprising polycarbonate has a weight average molecular weight of 15,000 to 60,000 grams per mole, as measured by gel permeation chromatography using polycarbonate standards;
the polymer material comprising polycarbonate has a glass transition temperature of 135° C. or greater;
the thermoplastic composition has a color difference delta E* of less than 1.0, as determined using a 3.2 mm color plaque, following molding at 620° F. for 120 seconds; and
the thermoplastic composition has a color difference delta b* of less than 0, as determined using a 3.2 mm color plaque, following molding at 620° F. for 120 seconds.

13. The thermoplastic composition of claim 1, wherein the passivation material is a compound of formula

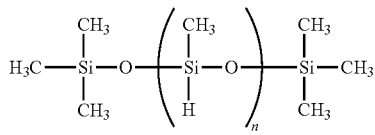

wherein n is an integer from 1 to 100.

14. The thermoplastic composition of claim 1, wherein the passivation material is present in an amount of 0.1 to 10 weight percent, based on the total weight of the passivated inorganic chromophore.

15. The thermoplastic composition of claim 1, wherein:
the thermoplastic composition has less than 200 parts per million of residual phenolic OH end groups, based on the total weight of the composition;
the polymer material comprising polycarbonate has a weight average molecular weight of 15,000 to 60,000 grams per mole, as measured by gel permeation chromatography using polycarbonate standards;
the polymer material comprising polycarbonate has a glass transition temperature of 135° C. or greater;
the thermoplastic composition has a color difference delta E* of less than 1.0, as determined using a 3.2 mm color plaque, following molding at 620° F. for 120 seconds; and
the thermoplastic composition has a color difference delta b* of less than 0, as determined using a 3.2 mm color plaque, following molding at 620° F. for 120 seconds.

16. The thermoplastic composition of claim 1, wherein:
the thermoplastic composition has less than 175 parts per million of residual phenolic OH end groups, based on the total weight of the composition;
the polymer material comprising polycarbonate has a weight average molecular weight of 15,000 to 60,000 grams per mole, as measured by gel permeation chromatography using polycarbonate standards;
the polymer material comprising polycarbonate has a glass transition temperature of 135° C. or greater;
the thermoplastic composition has a color difference delta E* of less than 1.0, as determined using a 3.2 mm color plaque, following molding at 620° F. for 120 seconds; and
the thermoplastic composition has a color difference delta b* of less than 0, as determined using a 3.2 mm color plaque, following molding at 620° F. for 120 seconds.

17. The thermoplastic composition of claim 1, having a color difference delta E* of less than 1.0, as determined using a 3.2 mm color plaque, following molding at 620° F. for 120 seconds.

18. The thermoplastic composition of claim 1, having a color difference delta b* of less than 0, as determined using a 3.2 mm color plaque, following molding at 620° F. for 120 seconds.

19. The thermoplastic composition of claim 1, wherein the passivation layer comprises at least two passivation materials, wherein the thermoplastic composition has less than 200 parts per million of residual phenolic OH end groups, based on the total weight of the composition, and wherein the at least two passivation materials comprise a first passivation material comprising a silane including at least one hydride functional group and a second passivation material comprising a silane including at least one hydroxy functional group.

20. A method of forming the thermoplastic composition of claim 1, the method comprising:
   contacting the passivation material and the inorganic chromophore under conditions effective to provide the passivated inorganic chromophore; and
   combining the passivated inorganic chromophore and the polymer material under conditions effective to provide the thermoplastic composition.

21. An article comprising the thermoplastic composition of claim 1.

\* \* \* \* \*